(12) United States Patent
Kim

(10) Patent No.: US 7,352,093 B2
(45) Date of Patent: Apr. 1, 2008

(54) FLAT TYPE VIBRATION MOTOR AND ROTOR STRUCTURE

(75) Inventor: Joo Hyoung Kim, Gwangju-si (KR)

(73) Assignee: LG Innotek Co., Ltd., Seoul (KR)

( * ) Notice: Subject to any disclaimer, the term of this patent is extended or adjusted under 35 U.S.C. 154(b) by 428 days.

(21) Appl. No.: 10/843,505

(22) Filed: May 12, 2004

(65) Prior Publication Data

US 2004/0227418 A1    Nov. 18, 2004

(30) Foreign Application Priority Data

May 13, 2003   (KR)   ............... 10-2003-0030095

(51) Int. Cl.
*H02K 7/06*   (2006.01)

(52) U.S. Cl. ........................................ 310/81

(58) Field of Classification Search ............... 310/81, 310/261, 264, 267, 268
See application file for complete search history.

(56) References Cited

U.S. PATENT DOCUMENTS 5,793,133 A * 8/1998 Shiraki et al. ............. 310/81
6,621,188 B2 * 9/2003 An et al. .................... 310/81
2002/0047370 A1 * 4/2002 An et al. .................... 310/81

FOREIGN PATENT DOCUMENTS

KR   20-0289955   9/2002

* cited by examiner

*Primary Examiner*—Dang Le
(74) *Attorney, Agent, or Firm*—Birch, Stewart, Kolasch & Birch, LLP

(57) ABSTRACT

The present invention relates to a flat type vibration motor and a rotor structure, which can increase a vibration amount of the vibration motor by the rotor structure adapted to increase a volume of a weight formed on a substrate. The weight is formed with the stepped portion formed on the surface thereof, which is contacted with the substrate and the substrate is formed on an inserting hole or an inserting groove corresponding to the stepped portion, so that the stepped portion can be engaged with the inserting hole or the inserting groove. Alternatively, the weight is formed with a mounting groove and the substrate is formed with the inserting hole or the inserting groove and the fixing bar.

30 Claims, 9 Drawing Sheets

FLAT TYPE VIBRATION MOTOR AND ROTOR STRUCTURE

This Non-provisional application claims priority under 35 U.S.C. § 119(a) on Patent Application No(s). 10-2003-0030095 filed in Korea on May 13, 2003, the entire contents of which are hereby incorporated by reference.

BACKGROUND OF THE INVENTION

1. Field of the Invention

The present invention relates to a vibration motor, and more particularly, to a flat type vibration motor and a rotor structure, which can increase a vibration amount of the vibration motor by the rotor structure adapted to increase a volume of a weight formed on a substrate.

2. Description of the Related Art

Generally, a flat type vibration motor is used in a mobile communication terminal such as a pager, a mobile phone, etc., so as to realize a vibration function.

It is required that the vibration motor mounted in the mobile communication terminal has a compact body according to the pursuit of ever smaller and lighter device and, at the same time, generates relatively large vibration.

FIG. 1 is a cross-sectional view of a conventional flat type vibration motor. Referring to FIG. 1, the flat type vibration motor comprises a lower case 11, a lower substrate 13 mounted on the lower case 11, a magnet 15 fixedly disposed on the lower case 11, an upper case 12 fitted to an outer edge of the lower case 11, a rotational shaft 17 supported between the lower case 11 and the upper case 12, a rotor 20 rotatably inserted onto the rotational shaft 17, a brush 19 of which one end is fixed to the lower substrate 13 and the other end is connected to a commutator formed on a lower surface of the rotor 20 so as to supply power to the rotor 20.

The magnet 15 has a ring shape so that a north pole and a south pole thereof are alternately and repeatedly arranged on the edge of the lower case 11.

The rotor 20 will be described in detail with reference to FIG. 2.

FIG. 2 shows a plan view of a rotor used in the conventional flat type vibration motor, and a cross-sectional view taken along a line I-I'. Referring to FIG. 2, the conventional rotor 20 comprises a base 21 formed of synthetic resin by injection molding, a substrate 29 for supporting a lower side of the base 21 and supplying external power, a bearing 23 disposed at a rotational center of the base 21 in order for the rotor 20 to be smoothly rotated, a wound coil 27 connected to the substrate 29 so as to receive the external power and thus generate magnetic flux, for generating rotational force of the rotor 20 and a weight 25 providing between the wound coils 27 so as to generate eccentric vibration.

The weight 25 attached to the substrate 29 is to have an influence on a center of gravity of the rotor 20 and increase the eccentric force when the rotor 20 is rotated. The weight 25 has a sector shape.

An operation of the conventional flat type vibration as described above will be described below.

First of all, if the external power is supplied from the lower substrate 13 through the brush 19 to the substrate 29, the power is applied to the wound coil 27 connected to the substrate 29, thereby generating the magnetic flux.

Due to electromagnetic force by the interaction between the magnetic flux generated from the wound coil 27 and the magnetic flux from the magnet 15, the rotor 20 is rotated.

At this time, since the weight 25 and the wound coil 27 are eccentrically provided at a side of the rotational center, there occurs an eccentric rotational action and thus generates the vibration However, in a process of attaching the weight 25 to the substrate 29, if the attaching positions are not constant, the position of the weight 25 may be varied. Thus, the center of mass of the rotor 20 is varied and the vibration amount is also varied.

Therefore, in order for the weight 25 to be placed at a proper position between the wound coils 27 in the process of attaching the weight 25 to the substrate 29, there is a problem that it is necessary to use a separate apparatus or equipment for fixing the weight 25 at the proper position.

Meanwhile, in order to increase the vibration amount of the flat type vibration motor, there is a way of increasing a weight of the weight 25.

However, since the weight 25 is provided between the wound coils 27, a surface area for positioning the weight 25 is extremely limited.

Therefore, in order to increase the vibration amount of the vibration motor, a thickness of the weight 25 has to be increased, there by increasing the weight of the weight 25.

SUMMARY OF THE INVENTION

Accordingly, the present invention is directed to a vibration motor and a rotor structure that substantially obviate one or more problems due to limitations and disadvantages of the related art.

An object of the present invention is to provide a vibration motor and a rotor structure, in which a vibration amount of the vibration motor is increased and a position of a weight provided to a rotor is constant.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a flat type vibration motor, comprising: a case; a magnet provided in the case; a shaft supported between top and bottom of the case; a rotor coupled to the shaft and including a base, a substrate formed with an inserting hole or an inserting groove and supporting the base, a coil connected to the substrate, and a weight formed with a stepped portion protruded from a surface thereof, the stepped portion being inserted into the inserting hole or the inserting groove.

In another aspect of the present invention, there is provided a flat type vibration motor comprising: a case; a magnet provided in the case; a shaft supported between top and bottom of the case; a rotor coupled to the shaft and including a base, a coil, a weight formed with a mounting groove formed in a surface thereof, and a substrate formed with an inserting hole or an inserting groove in which the weight is inserted and a fixing bar which is engaged with the mounting groove of the weight.

In a further aspect of the present invention, there is provided a rotor structure of a vibration motor comprising: a base; a substrate formed with an inserting hole or an inserting groove and supporting the base; a coil connected to the substrate; and a weight formed with a stepped portion protruded from a surface thereof, the stepped portion being inserted into the inserting hole or the inserting groove of the substrate.

In a further another aspect of the present invention, there is provided a rotor structure of a vibration motor comprising: a base; a weight formed with a mounting groove formed in a surface thereof; a substrate formed with an inserting hole or an inserting groove in which the weight is inserted and a fixing bar which is engaged with the mounting groove of the weight; and a coil connected to the substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
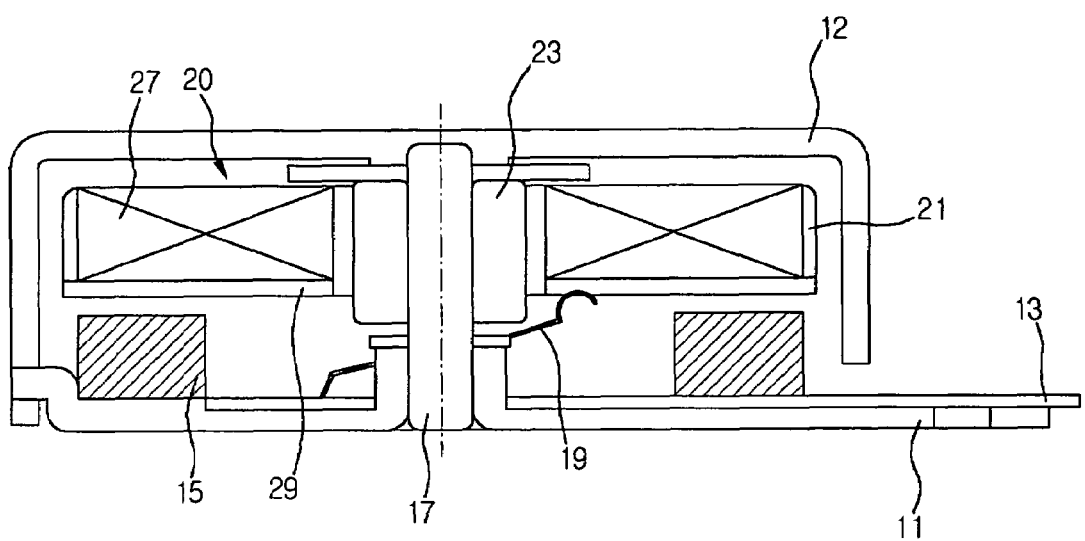
FIG. 1 is a cross-sectional view of a conventional flat type vibration motor.
Figure 2:
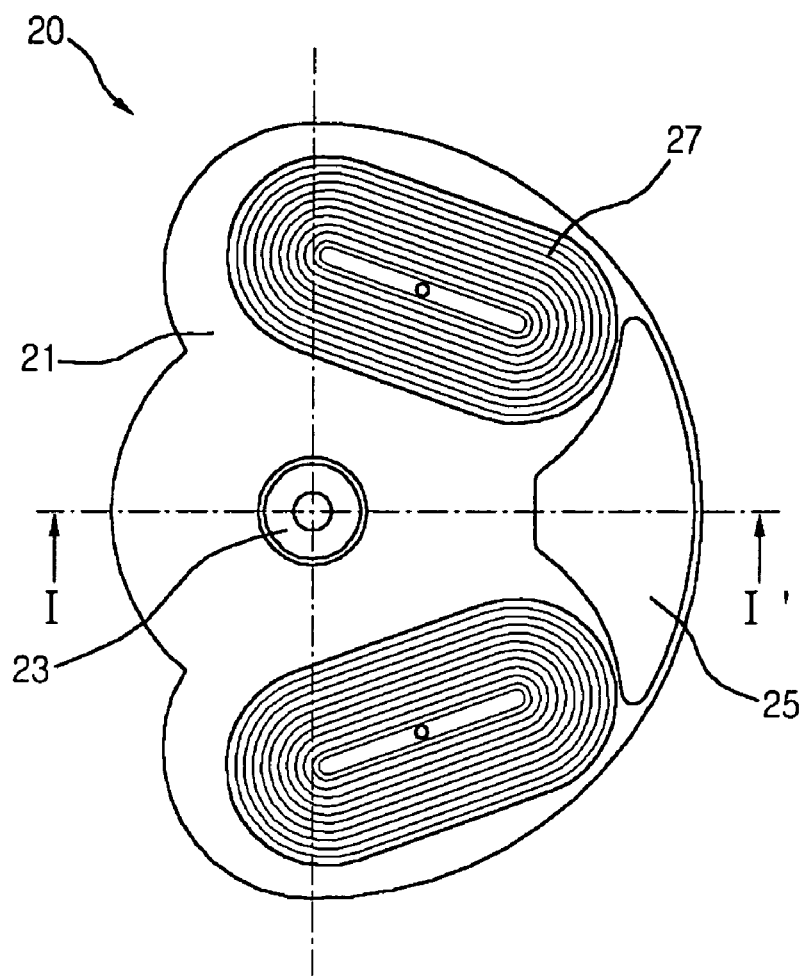
FIG. 2 shows a plan view of the conventional flat type vibration motor and a cross-sectional view taken along a line I-I'.
Figure 2:
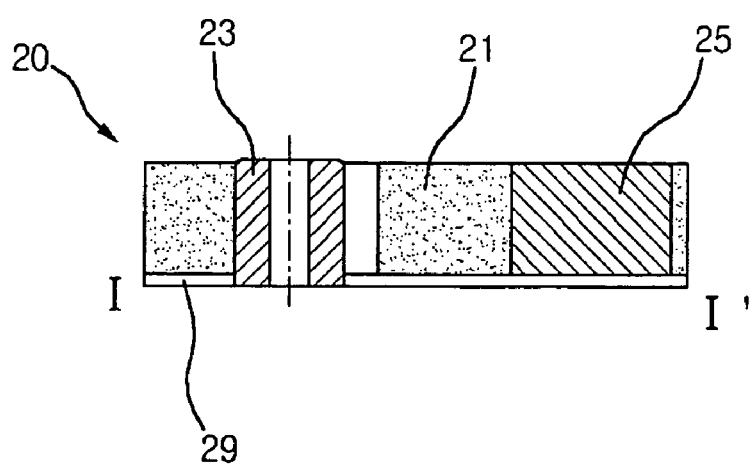
Figure 3:
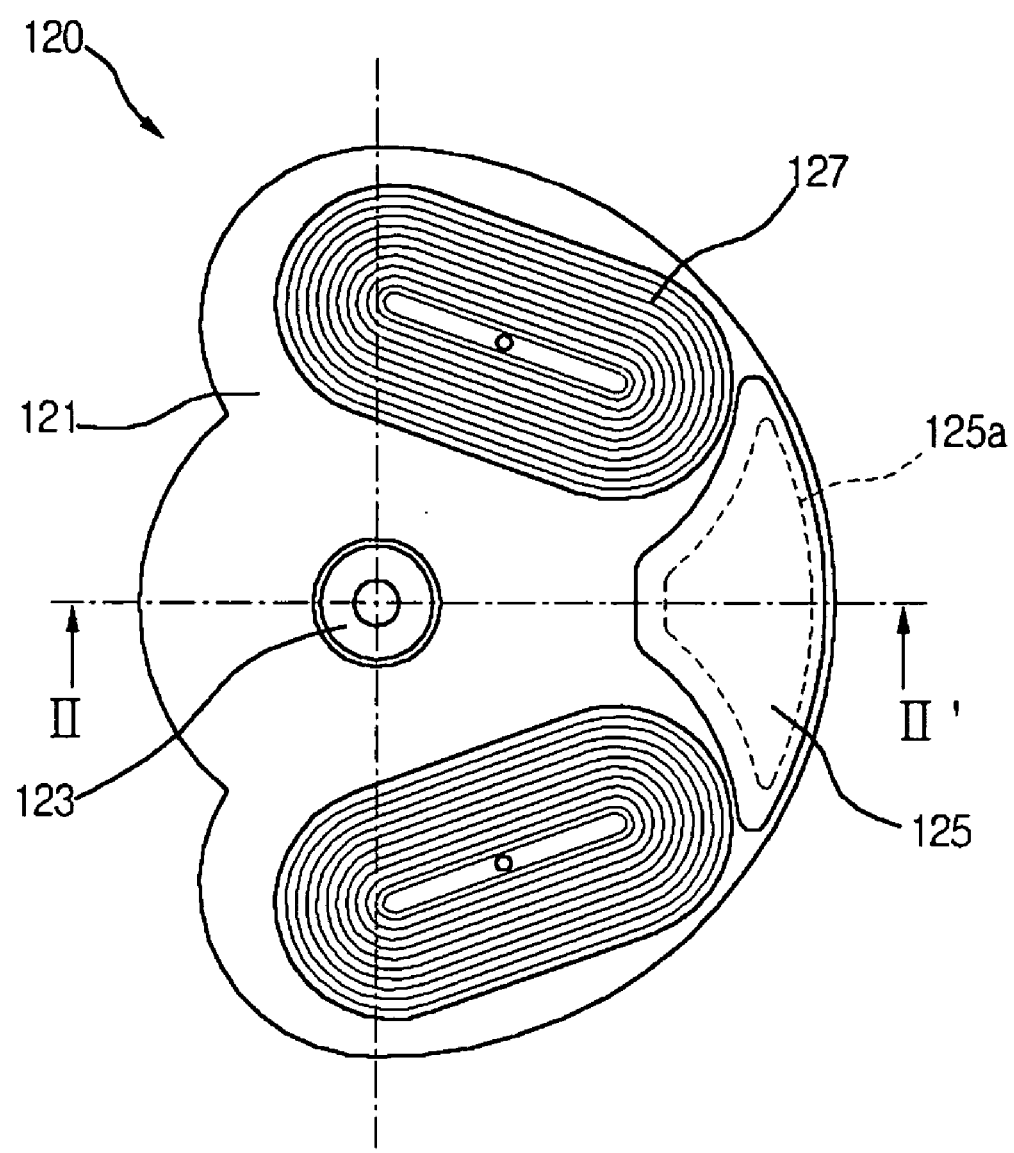
FIG. 3 a plan view showing a rotor structure of a flat type vibration motor according to a first embodiment of the present invention.
Figure 4:
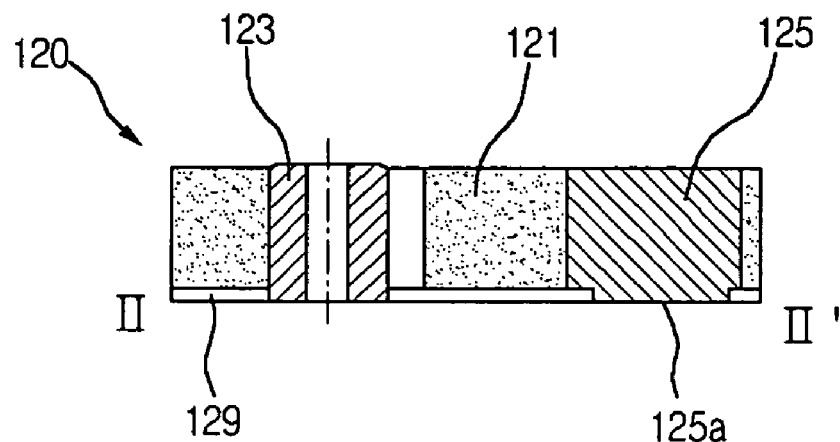
FIG. 4 is a cross-sectional view of the rotor formed with an inserting hole, taken along a line II-II' of FIG. 3.
Figure 5:
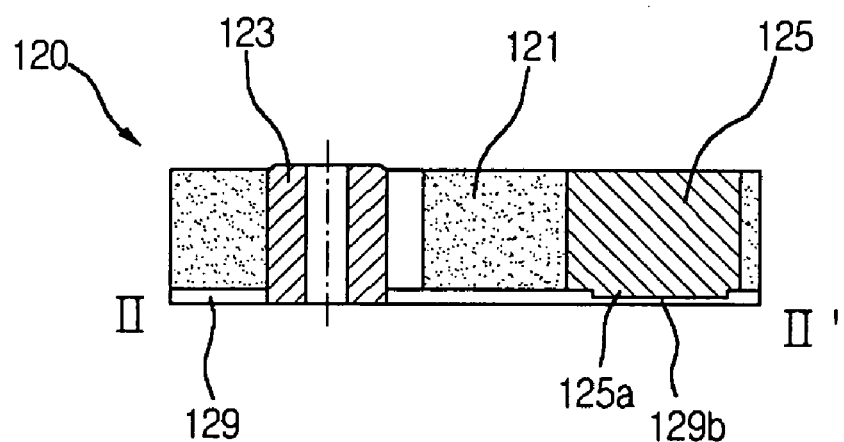
FIG. 5 is a cross-sectional view of the rotor formed with an inserting groove, taken along a line II-II' of FIG. 3.
Figure 6:
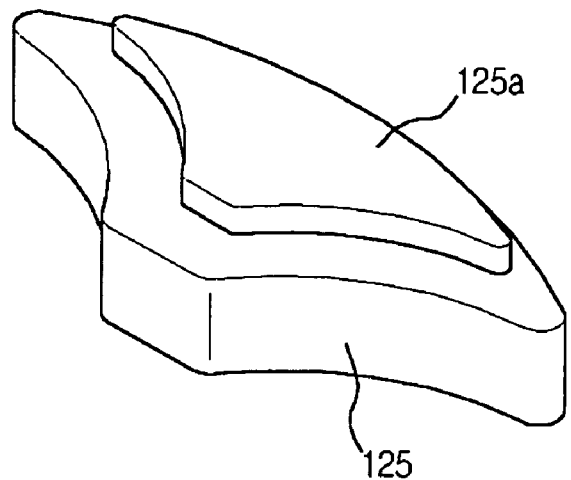
FIG. 6 is a perspective view of a weight structure according to the first embodiment of the present invention.
Figure 7:
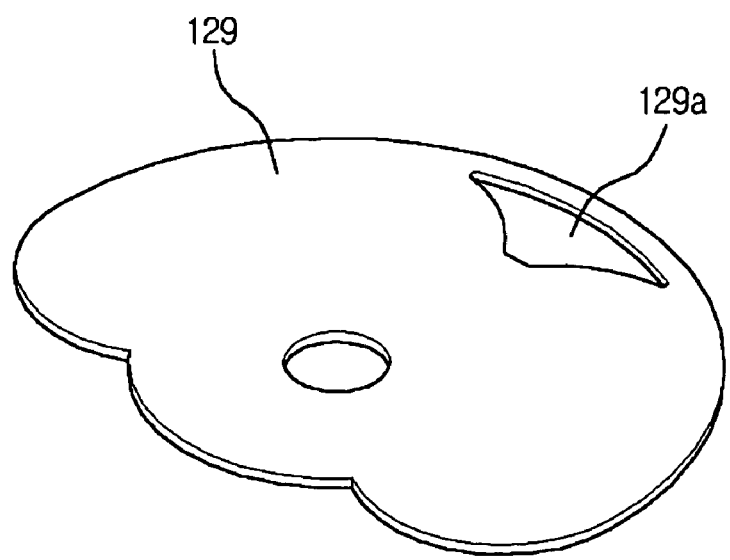
FIG. 7 is a perspective view of a substrate structure formed with the inserting hole according to the first embodiment of the present invention.
Figure 8:
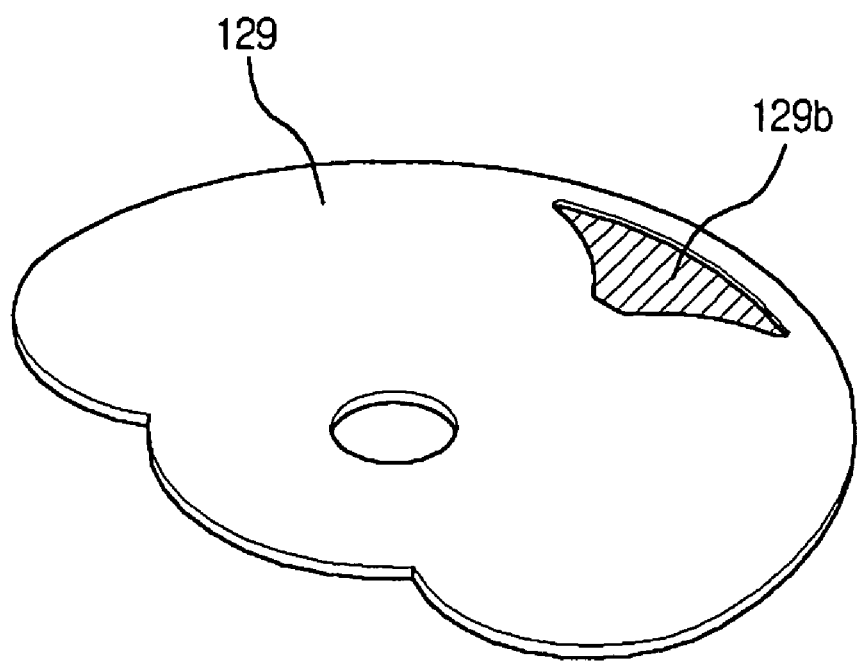
FIG. 8 is a perspective view of the substrate structure formed with the inserting groove according to the first embodiment of the present invention.

FIG. 3 is a plan view showing a rotor structure of a flat type vibration motor according to a first embodiment of the present invention, FIG. 4 is a cross-sectional view of the rotor formed with an inserting hole, taken along a line II-II' of FIG. 3, FIG. 5 is a cross-sectional view of the rotor formed with an inserting groove, taken along a line II-II' of FIG. 3, FIG. 6 is a perspective view of a weight structure according to the first embodiment of the present invention, FIG. 7 is a perspective view of a substrate structure formed with the inserting hole according to the first embodiment of the present invention and FIG. 8 is a perspective view of the substrate structure formed with the inserting groove according to the first embodiment of the present invention.

Referring to FIGS. 3 to 5, a rotor 120 according to the present invention comprises a base 121 formed of synthetic resin by injection molding, a substrate 129 for supporting a lower side of the base 121 and supplying external power, a bearing 123 disposed at a rotational center of the base 121 in order for the rotor 120 to be smoothly rotated, a wound coil 127 connected to the substrate 129 so as to receive the external power and thus generate magnetic flux, for generating rotational force of the rotor 120 and a weight 125 providing between the wound coils 27 so as to generate eccentric vibration.

The base 121 has a sector shape so that a center of gravity of the rotor 120 is biased to a side.

Referring to FIGS. 6 to 8, the weight 125 according to the present invention is formed with a stepped portion 125a so that a contacting surface with the substrate 129 is protruded in a desired height. Here, the stepped portion 125a can be formed in more than one surface of the weight 125. Further, on the substrate 129, there is formed an inserting hole 129a or an inserting groove 129b corresponding to a shape of the stepped portion 125a.

The stepped portion 125a of the weight 125 is inserted into the inserting hole 129a or the inserting groove 129b, so that the weight 125 is coupled to the substrate 129.

In a case that the stepped portion 125a is coupled to the substrate 129 formed with the inserting hole 129a as shown in FIG. 7, the stepped portion 125a has a height corresponding to a thickness of the substrate 129.

Furthermore, in a case that the stepped portion 125a is coupled to the substrate 129 formed with the inserting groove 129b as shown in FIG. 8, the stepped portion 125a has a height corresponding to a thickness of the inserting groove 129b.

Herein, the stepped portion 125a of the weight 125 is guided and then inserted into the inserting hole 129a or the inserting groove 129b. An edge portion of the weight 125 surface-contacted with the substrate 129 is attached by an adhesive.

In a coupling process as described above, a mounting position of the weight 125 is naturally determined by the coupling relationship between the stepped portion 125a of the weight 125 and the inserting hole 129a or inserting groove 129b of the substrate 129.

Accordingly, when the weight 125 is coupled to the substrate 129, since the weight 125 is naturally fixed to the substrate 129 by the mutual engagement between the stepped portion 125a of the weight 125 and the inserting hole 129a or inserting groove 129b of the substrate 129, it is not necessary to use a separate apparatus or equipment for fixing the weight 125 to the proper mounting position. Further, a difference in the vibration amount due to variety of the mounting position of the weight 125 can be minimized.

According to the present invention, since a volume of the weight 125 is increased as large as the height of the stepped portion 125a of the weight 125, an entire weight of the weight 125 is increased and thus the vibration amount of the vibration motor is also increased.

Figure 9:
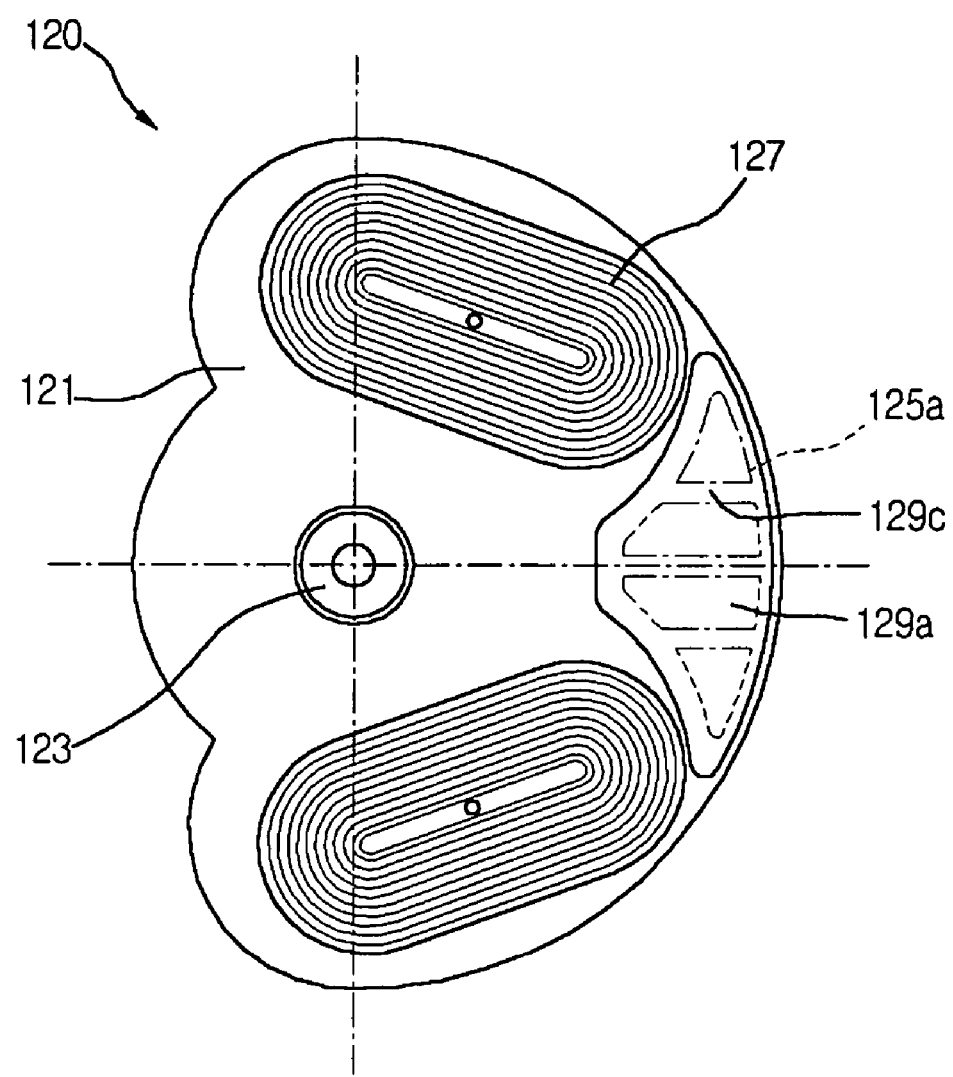
FIG. 9 is a plan view of a rotor structure of a flat type vibration motor according to a second embodiment of the present invention.
Figure 10:
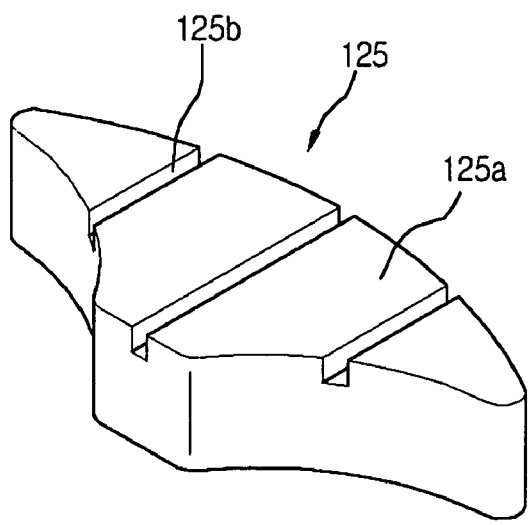
FIG. 10 is a perspective view of a weight structure according to the second embodiment of the present invention.
Figure 11:
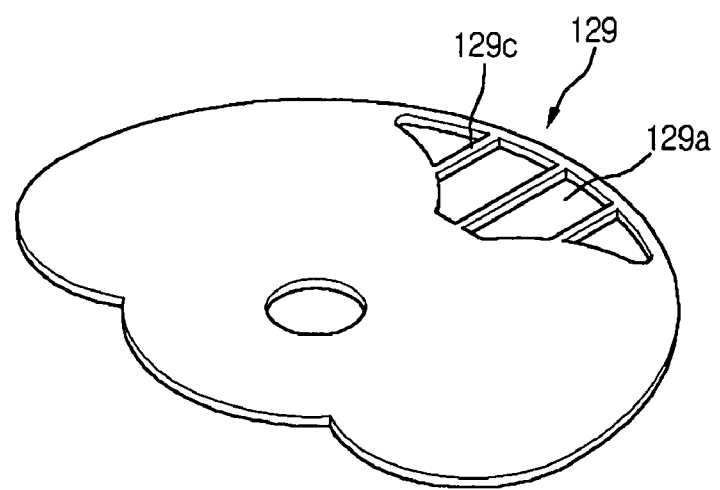
FIG. 11 is a perspective view of a substrate structure formed with the inserting hole according to the second embodiment of the present invention.
Figure 12:
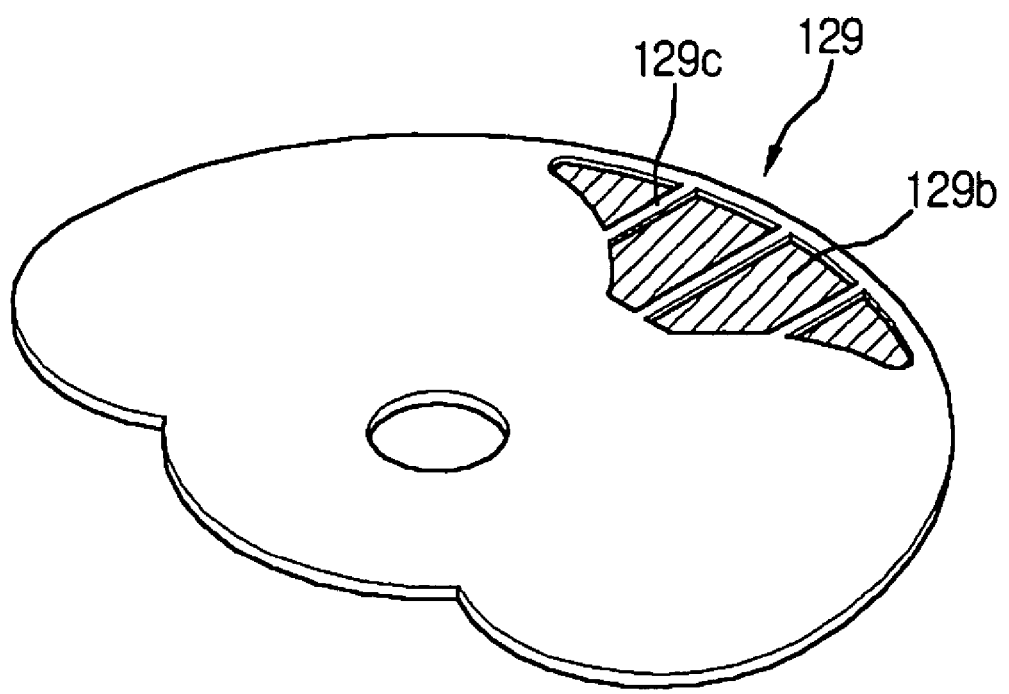
FIG. 12 is a perspective view of the substrate structure formed with the inserting groove according to the second embodiment of the present invention.

FIG. 9 is a plan view of a rotor structure of a flat type vibration motor according to a second embodiment of the present invention, FIG. 10 is a perspective view of a weight structure according to the second embodiment of the present invention, FIG. 11 is a perspective view of a substrate structure formed with the inserting hole according to the second embodiment of the present invention, and FIG. 12 is a perspective view of the substrate structure formed with the inserting groove according to the second embodiment of the present invention.

Referring to FIGS. 9 to 12, a weight 125 according to a second embodiment of the present invention is formed with a mounting groove 125b formed on a surface of the weight 125 at regular intervals. Here, the mounting groove 125b can be formed more than one.

Further, a substrate 129 according to the second embodiment of the present invention is formed with an inserting hole 129a passing through the substrate 129 or an inserting groove 129b having a desired depth, so that the weight 125 can be inserted into the inserting hole 129a or the inserting groove 129b. Here, the inserting hole 129a or the inserting groove can be formed more than one.

The inserting hole 129a or the inserting groove 129b of the substrate 129 has the same surface shape as at least one surface of the weight 125. The substrate 129 is also formed with a fixing bar 129c to be engaged with the mounting groove 125b of the weight 125. Here, the fixing bar 129c can be formed more than one.

In a case that the mounting groove 125b is coupled to the substrate 129 formed with the inserting hole 129a as shown in FIG. 11, the mounting groove 125b has a height corresponding to a thickness of the substrate 129.

In a case that the mounting groove 125b is coupled to the substrate 129 formed with the inserting groove 129b as shown in FIG. 12, the mounting groove 125b has a height corresponding to a thickness of the inserting groove 129b.

The weight 125 is coupled by the insertion of the fixing bar 129c into the mounting groove 125b.

At this time, a mounting position of the weight 125 is determined by the inserting hole 129a or inserting groove 129b and the fixing bar 129c of the substrate 129.

Further, the weight 125 is fixedly coupled to the substrate 129 by the adhesion between the mounting groove 125b and the fixing bar 129c of the substrate 129.

In addition, since a weight of the weight 125 is increased as large as a volume of the weight 125 inserted into the inserting hole 129a or the inserting groove 129b, the vibration amount of the vibration motor is increased.

According to the present invention, the weight is formed with the stepped portion formed on the surface thereof, which is contacted with the substrate and the substrate is formed on the inserting hole or the inserting groove corresponding to the stepped portion, so that the stepped portion can be engaged with the inserting hole or the inserting groove. Therefore, a weight of the weight is increased as large as the thickness of the stepped portion, thereby increasing the vibration amount of the vibration motor.

Further, since the weight can be placed at the proper position without the separate apparatus or equipment for fixing the weight to the proper mounting position, when fabricating the vibration motor, a process of forming the weight can be facilitate, and the difference in the vibration amount due to the variety of the mounting position of the weight can be minimized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flat type vibration motor, comprising:
   a case;
   a magnet provided in the case;
   a shaft supported between top and bottom of the case; and
   a rotor coupled to the shaft and including a base, a substrate formed with an inserting hole or an inserting groove, the substrate arranged between the base and the magnet and supporting the base, a coil connected to the substrate, and a weight formed with a stepped portion protruded from a surface thereof, the stepped portion being inserted into the inserting hole or the inserting groove,
   wherein the base includes a hole formed therein and a portion of the weight other than the stepped portion is inserted into the hole of the base.

2. The vibration motor according to claim 1, wherein the inserting hole or the inserting groove is formed to be corresponding to a shape of the stepped portion of the weight.

3. The vibration motor according to claim 1, wherein the rotor further comprises a bearing disposed at the base.

4. The vibration motor according to claim 1, wherein the weight is provided between the coils.

5. The vibration motor according to claim 1, wherein the stepped portion of the weight has a thickness that is the same as a thickness of the substrate or a thickness of the inserting groove.

6. The vibration motor according to claim 1, wherein an edge portion of the weight, which is formed at an outside of the stepped portion, is attached to the substrate.

7. The vibration motor according to claim 1, wherein the stepped portion of the weight is inserted into the inserting hole or the inserting groove.

8. A flat type vibration motor, comprising:
   a case;
   a magnet provided in the case;
   a shaft supported between top and bottom of the case; and
   a rotor coupled to the shaft and including a base, a coil, a weight formed with a mounting groove formed in a surface thereof, and a substrate formed with an inserting hole or an inserting groove in which the weight is inserted and a fixing bar which is engaged with the mounting groove of the weight.

9. The vibration motor according to claim 8, wherein the inserting hole or the inserting groove of the substrate has the same surface shape as that of the surface of the weight.

10. The vibration motor according to claim 8, wherein the rotor further comprises a bearing disposed at the base.

11. The vibration motor according to claim 8, wherein the mounting groove of the weight is coupled to the fixing bar of the substrate.

12. The vibration motor according to claim 8, wherein a depth of the mounting groove is the same as a thickness of the substrate or a thickness of the inserting groove.

13. The vibration motor according to claim 8, wherein a mounting position of the weight becomes constant by the inserting hole or the inserting groove and the fixing bar.

14. The vibration motor according to claim 8, wherein the mounting groove of the weight is attached to the fixing bar of the substrate.

15. The vibration motor according to claim 8, wherein the weight is provided between the coils.

16. A rotor structure of a vibration motor, comprising:
a base;
a substrate formed with an inserting hole or an inserting groove, the substrate supporting the base;
a coil connected to the substrate; and
a weight formed with a stepped portion protruded from a surface thereof, the stepped portion being inserted into the inserting hole or the inserting groove of the substrate,
wherein the upper surface and lower surface of the weight are exposed from the base and the substrate, respectively, the base includes a hole formed therein, and a portion of the weight other than the stepped portion is inserted into the hole of the base.

17. The rotor structure according to claim 16, wherein the inserting hole or the inserting groove is formed to be corresponding to a shape of the stepped portion of the weight.

18. The rotor structure according to claim 16, wherein the stepped portion of the weight has the same thickness as the substrate or the inserting hole.

19. The rotor structure according to claim 16, wherein the weight is provided between the coils.

20. The rotor structure according to claim 16, wherein an edge portion of the weight, which is formed at an outside of the stepped portion, is attached to the substrate.

21. The rotor structure according to claim 16, wherein the stepped portion of the weight is inserted into the inserting hole or the inserting groove.

22. The rotor structure according to claim 16, wherein the stepped portion of the weight is protruded from more than one surface thereof.

23. A rotor structure of a vibration motor, comprising:
a base;
a weight formed with a mounting groove formed in a surface thereof;
a substrate formed with an inserting hole or an inserting groove in which the weight is inserted and a fixing bar which is engaged with the mounting groove of the weight; and
a coil connected to the substrate.

24. The rotor structure according to claim 23, wherein the inserting hole or the inserting groove of the substrate has the same surface shape as the surface of the weight.

25. The rotor structure according to claim 23, wherein the mounting groove of the weight is coupled to the fixing bar of the substrate.

26. The rotor structure according to claim 23, wherein a depth of the mounting groove is the same as the thickness of the substrate or the inserting hole.

27. The rotor structure according to claim 23, wherein a mounting position of the weight becomes constant by the inserting hole or the inserting groove and the fixing bar.

28. The rotor structure according to claim 23, wherein the mounting groove of the weight is attached to the fixing bar of the substrate.

29. The rotor structure according to claim 23, wherein the weight is provided between the coils.

30. The rotor structure according to claim 23, wherein the substrate formed with more than one inserting hole or inserting groove and fixing bar, and the weight formed with more than one mounting groove.

* * * * *